United States Patent
Sharp et al.

(10) Patent No.: US 11,358,383 B2
(45) Date of Patent: Jun. 14, 2022

(54) PASSIVE OBJECT HANDLING DEVICE

(71) Applicant: TONEJET LIMITED, Royston (GB)

(72) Inventors: John Lawton Sharp, Cambridge (GB); Ian Philip Butler Ingham, Cambridge (GB); Jeffrey Mark Woods, Cambridge (GB); Simon John Edwards, Cambridge (GB); Andrew John Clippingdale, Cambridge (GB); Jonathan James Michael Halls, Cambridge (GB)

(73) Assignee: Tonejet Limited, Royston (GB)

( * ) Notice: Subject to any disclaimer, the term of this patent is extended or adjusted under 35 U.S.C. 154(b) by 357 days.

(21) Appl. No.: 16/345,435

(22) PCT Filed: Nov. 2, 2017

(86) PCT No.: PCT/EP2017/078039
§ 371 (c)(1),
(2) Date: Apr. 26, 2019

(87) PCT Pub. No.: WO2018/083167
PCT Pub. Date: May 11, 2018

(65) Prior Publication Data
US 2019/0248128 A1 Aug. 15, 2019

(30) Foreign Application Priority Data

Nov. 2, 2016 (EP) ..................................... 16196961
Nov. 2, 2016 (EP) ..................................... 16196962

(Continued)

(51) Int. Cl.
*B41J 3/407* (2006.01)
*B41F 17/00* (2006.01)
(Continued)

(52) U.S. Cl.
CPC ............ *B41F 17/002* (2013.01); *B41F 17/18* (2013.01); *B41F 17/20* (2013.01); *B41J 3/4073* (2013.01);
(Continued)

(58) Field of Classification Search
CPC ........ B41F 17/002; B41F 17/18; B41F 17/20; B41J 3/407; B41J 3/4073; B41J 3/40733
See application file for complete search history.

(56) References Cited

U.S. PATENT DOCUMENTS

2015/0005960 A1   1/2015   Endrizzi et al.

FOREIGN PATENT DOCUMENTS

| CN | 104401114 A | 3/2015 |
| CN | 105008133 A | 10/2015 |

(Continued)

OTHER PUBLICATIONS

International Search Report and Written Opinion in Appl. No. PCT/EP2017/078039 dated Jan. 25, 2018, 16 pages.

(Continued)

*Primary Examiner* — Leslie J Evanisko
(74) *Attorney, Agent, or Firm* — Kowert, Hood, Munyon, Rankin & Goetzel, P.C.

(57) ABSTRACT

The present disclosure provides an apparatus for handling objects. The apparatus comprises a carrying device (104) that is configured to move along a track (102). A handling device (224) is adapted to hold an object (108) and is mounted to the carrying device (104) such that it is rotatable with respect to the carrying device about a handling axis (226). A drive device (310) is disposed at a position along the track (102) and configured to produce a torque around a drive axis. The carrying device (104) can be moved along the track (102) in a direction perpendicular to the drive axis into and out of a drive position. In the drive position, the handling axis (226) of the handling device (224) is in substantial alignment with the drive axis of the drive device (310) whereupon the drive device induces a torque in the (Continued)

handling device (224) causing the handling device to rotate, thereby causing the object (108) held by the handling device to rotate.

20 Claims, 3 Drawing Sheets

(30) Foreign Application Priority Data

Nov. 2, 2016 (EP) .................................... 16196963
Nov. 2, 2016 (EP) .................................... 16196965

(51) Int. Cl.
*B41F 17/18* (2006.01)
*B41F 17/20* (2006.01)
*F16D 27/01* (2006.01)
*B41J 11/00* (2006.01)

(52) U.S. Cl.
CPC ......... *B41J 3/40733* (2020.08); *B41J 11/002* (2013.01); *F16D 27/01* (2013.01)

(56) References Cited

FOREIGN PATENT DOCUMENTS

| | | |
|---|---|---|
| CN | 105966949 A | 9/2016 |
| CN | 205631665 U | 10/2016 |
| DE | 1075903 | 2/1960 |
| EP | 2100734 | 9/2009 |
| EP | 2842747 | 3/2015 |
| JP | 2017-200840 A | 11/2017 |
| WO | 2014076704 | 5/2014 |
| WO | 2014126447 A1 | 8/2014 |
| WO | WO-2019130667 A1 * 7/2019 ............. B65D 25/20 |

OTHER PUBLICATIONS

Office Action in Chinese Appl. No. 201780066947.4 dated Sep. 21, 2020, 10 pages.
Office Action in Japanese Appl. No. 2019-517955 dated Oct. 1, 2021, 4 pages.

* cited by examiner

PASSIVE OBJECT HANDLING DEVICE

The present invention relates to an apparatus for moving and rotating objects in a printing system. In particular, the apparatus comprises a moveable carrying device and a separate drive device. The drive device couples to a rotatable section of the carrying device and provides a torque to the rotatable section.

BACKGROUND

In industrial printing processes for printing in a series of steps onto discrete objects such as packaging containers, it is common for a series of objects to be carried between printing stations by a series of carrying devices. In order for printing devices at the printing stations to access a large portion of a three-dimensional object's surface, the carrying devices typically manipulate the object at the print station, for example, by rotating a cylindrical object around its longitudinal axis to expose an entire outer surface. Beverage cans and aerosol cans are examples of cylindrical objects that may be printed on such a system.

Existing types of apparatus for handling discrete objects through such a printing process include mandrel wheel systems, also known as spindle disc systems. Published U.S. Pat. No. 6,769,357 shows an example of a mandrel wheel system.

In mandrel wheel systems, a plurality of mandrels are fixed with equal spacing around a rotating or indexing wheel. In some examples, each mandrel has an associated in-built servo motor that provides rotation of the object. In these examples, the servo motors require power and control connections provided by a rotating coupling system on the central axis of the mandrel wheel. In other examples, each mandrel is mechanically driven by belt or gears from a single motor. Because all mandrels on the mandrel wheel are constrained to index at the same time, throughput is limited to the speed of the slowest process in the sequence. As a result, processing stations performing fast processes are required to have an inactive period while slower processes are completed at other stations. Indexing distance and dwell time at stations cannot be varied to suit the size or process time of that station.

Also known are linear track systems in which one or more mandrels or object holders are moved in a group between stations along a linear track. The mandrels return along the track to the start position after printing. This reciprocating motion allows power and control connections to be provided to the mandrel motors via flexible cabling without moving contacts. Such reciprocating systems, however, have low throughput because the cycle time has to accommodate the return of the mandrels in the reverse direction along the track to its start position.

To address the issues described above, more complex carrying systems are being developed that allow greater flexibility in how objects may be carried through a printing process. By removing constraints on object movement imposed by the known systems described above, more efficient processes may be developed where, for example, time during which processing stations are inactive is minimized.

A challenge to be overcome in the provision of more complex/flexible printing systems is how to provide services to each of the carrying devices in order to power, control and measure the rotation of objects while undergoing printing processes. Known arrangements of connections such as those used in mandrel wheel or linear track systems are suited to simple systems, and it would be difficult (requiring a complex arrangement of moving contacts, rotatable couplings, slip-rings, etc.) to adapt these arrangements to more complex systems where, for example, the relative positions of carrying devices vary throughout a printing cycle.

Consequentially, there is a need for an improved system for providing controlled rotation to moveable objects.

SUMMARY OF INVENTION

The present disclosure provides an apparatus for handling objects, the apparatus comprising: a carrying device that is configured to move along a track;

a handling device that is adapted to hold an object and is mounted to the carrying device such that it is rotatable with respect to the carrying device about a handling axis; a drive device disposed at a position along the track and configured to produce a torque around a drive axis; wherein the carrying device can be moved along the track in a direction perpendicular to the drive axis into and out of a drive position, wherein: in the drive position, the handling axis of the handling device is in substantial alignment with the drive axis of the drive device whereupon the drive device induces a torque in the handling device causing the handling device to rotate, thereby causing the object held by the handling device to rotate.

The provision of an apparatus in which the drive device that generates a torque in the rotatable handling device is not part of the carrying device is advantageous over known devices because it removes the need for electrical or other connections to the independently moveable carrying device to rotate the carried object.

The provision of a system in which the carrying device moves in a direction perpendicular to the drive axis into and out of a drive position is advantageous because it provides a system in which the drive device can couple to the handling device without requiring active control of the axial separation between the drive device and the handling device.

Preferably, the handling device comprises at least one magnetic element, and wherein the drive device generates a rotating magnetic field, which acts on the at least one magnetic element of the handing device to produce the torque.

Preferably, the rotating magnetic field is produced by at least one magnetic coil that is driven with an alternating electric current.

Preferably, the drive device comprises a rotating drive element comprising at least one permanent magnet.

Preferably, the drive device couples torque to the handling device by friction.

Preferably, the rotation of the handling device is synchronised with the rotation of the drive device when the carrying device is in the drive position.

Preferably, the path along which the carrying device is configured to move is defined by a track, and, preferably, wherein the track forms a closed path on which the carrying device can be moved.

Preferably, the drive device is positioned adjacent a processing station, wherein the processing station is configured to perform at least one of the following processes on the object carried by the handling device: loading, inspecting, cleaning, surface treatment, printing, drying, coating, curing, unloading.

Preferably, the apparatus comprises a rail or pad mounted adjacent to the track and wherein the handling device comprises a wheel configured to contact the rail or pad as it moves along the track, thereby causing the handling device to rotate as it is moved along the track.

Preferably, the handling device is adapted to hold a cylindrical object with its longitudinal axis parallel to the handling axis, and, preferably, wherein the cylindrical object is a can or tube.

Preferably, the drive device is positioned adjacent to a printing device comprising a printhead, and wherein, when the handling device is holding the cylindrical object, rotation of the handling device by the drive device causes the cylindrical object to be rotated such that the printhead is able to print a swathe around the entire circumference of the cylindrical object.

Preferably, wherein the drive device is one of a plurality of drive devices arranged along the path, and wherein the carrying device can be successively moved to each of the drive devices.

Preferably, the carrying device is one of a plurality of carrying devices, each of which is independently moveable with respect to the other carrying devices.

Preferably, the handling device comprises an encoder-ring having encoded thereon information identifying the angular position of the handling device, and wherein the apparatus further comprises a read-head proximate to each driving device configured to measure the angular position of the handling device by reading the encoder ring.

Preferably, the encoder ring has a diameter which is substantially the same as the diameter of the cylindrical object, such as to provide an equivalence, in an output from the read-head, between a linear displacement of the carrying device along the path and a circumferential displacement of the rotating cylindrical object on the handling device, thereby to compensate for an error in the position of the carrying device with respect to the printhead.

In another aspect of the disclosure, a method is provided for printing on objects using the printing apparatus, the method comprising: moving an object held by the handling device into the vicinity of a printhead by moving the carrying device into the drive position; rotating the handling device by operating the drive device when coupled to the handling device in the drive position; printing onto the object held by the handling device while the handling device is rotated.

Preferably, moving the carrying device into the drive position comprises moving the carrying device along the path in a direction perpendicular to the drive axis.

Preferably, while the object is being printed on, a further carrying device is moved along the track.

BRIEF DESCRIPTION OF THE FIGURES

FIG. 1 is a schematic block diagram of an example of a printing system for which the present invention is suitable for use with;

DETAILED DESCRIPTION OF THE INVENTION

The present invention provides an apparatus for handling objects in a printing apparatus that has a number of sequential processing stations, in which a moveable carrying device comprises a passive, rotatable handling device that is adapted to hold an object as it is moved through the sequence of processing stations. A respective drive device configured to rotate the passive handling device is positioned at each processing station which requires an object to be rotated. The carrying device is able to move into the vicinity of a drive device, such that the drive device couples to the passive, rotatable handling device, causing the handling device to rotate. This allows an object held by the handling device to be rotated at the processing station. This system is advantageous over previous systems, because the removal of the need for power and/or control signals to be provided to active moving elements simplifies the design considerations required to implement a printing system for discrete objects with object carrying devices that are independently moveable along a arbitrarily shaped track.

Processing stations of the printing apparatus may include, but are not limited to: loading stations, inspection stations, surface treatment stations, cleaning stations, printing stations, drying stations, fixing stations, coating stations, curing stations, and unloading stations.

Printing stations may provide one or more of a wide range of printing processes, including but not limited to conventional contact means (e.g. offset lithography and flexography), digital contact means (e.g. electrophotographic printing, digital offset printing and belt transfer printing) and digital non-contact means (e.g. inkjet printing, electrostatic inkjet printing and piezoelectric inkjet printing).

Printing typically takes place at one or more printing stations that are arranged along the track. The printing stations typically form a subset of greater number of processing stations arranged along the track.

Printing methods may be combined. For example, a first printing station may use offset printing to apply a first printed layer to the object, such as a white base layer, while subsequent printing stations may use digital printing, such as inkjet, to print a process colour image on the surface of the object.

Figure 1:
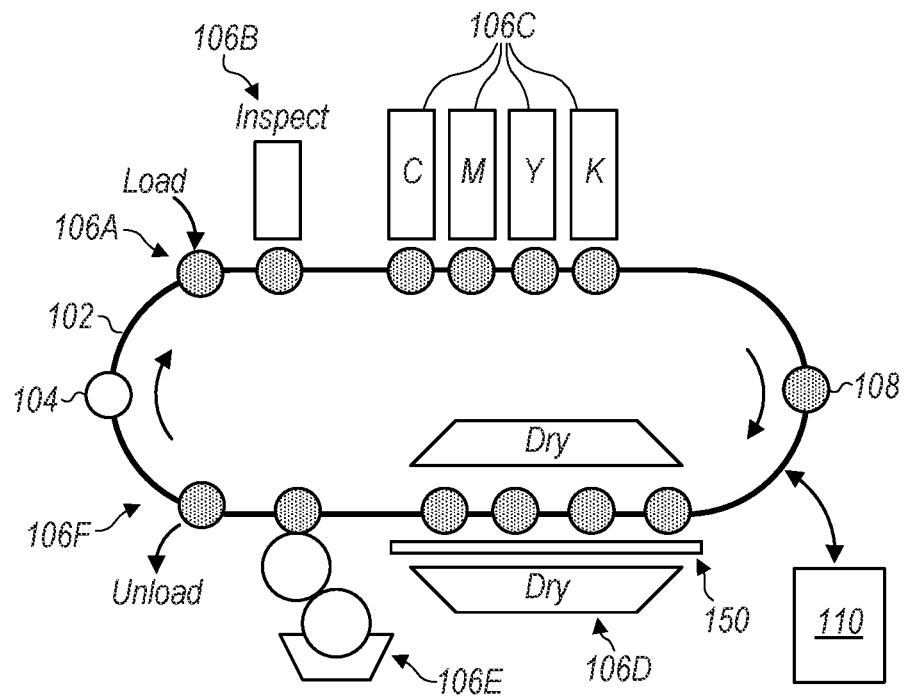

FIG. 1 shows an example of a printing system in which a plurality of carrying devices 104 (or "carriages") are independently moveable by a control device 110 along a closed track 102.

The carriages 104 comprise handling devices which in this embodiment comprise rotating mandrels adapted to carry cylindrical containers 108. Each mandrel is mounted to its respective carriage 104 via bearings that allow the mandrel to rotate around its central axis, and thereby rotate an attached cylindrical container 108 about its central axis, which is coaxial with the mandrel.

The apparatus comprises a track 102 on which a plurality of carriages 104 are disposed and along which the carriages 104 can move. A plurality of processing stations 106A-106F are arranged along the track 102, and each of the plurality of carriages 104 is configured to carry a container 108 successively into the vicinities of each of the processing stations 106A-106F. The processing stations 106 in the embodiment of FIG. 1 comprise a loading station 106A, an inspection station 106B, four single-colour printing stations 106C, a drying station 106D, a coating station 106E and an unloading station 106F.

Examples of suitable track systems for use in the present invention are Precision Track Systems from HepcoMotion and the iTRAK produced by Rockwell Automation.

One or more of the processing stations 106A-106F, such as printing stations 106C, require the object 108 to be rotated during processing (for example, during printing). At these processing stations, there are provided drive devices (not shown in FIG. 1) configured to engage the mandrels of the carriages 104 in order to rotate the mandrels and, hence, the containers 108. The drive devices are disposed at positions along the path that the carriages move on. A carriage can move relative to a drive device into a drive position in which the drive device engages the handling device to provide a torque to the handling device.

A control device 110 communicates with each of the carriages 104, either directly or via the track 102, in order to control the position and velocity of each of the carriages 104 independently with respect each other on the track 102.

Each carriage 104 is coupled to the track 102 firstly by means of a constraining force and secondly by means of a motive force. The constraining force requires the carriage to move only along the path of the track 102 and allows the carriage to be guided with high precision. In some embodiments the constraining force is provided by linear bearings mounted on the carriage 104 fitting into grooved paths in the track 102 which limits the motion of carriage 104 to one degree of freedom.

The motive force between the carriage 104 and the track 102 may be provided by a magnetic linear motor system. In this example, the carriages 104 comprise permanent magnet elements that couple electromagnetically to a system of electromagnets spaced around the track 102. A position sensing system measures the position of each carriage 104 on the track 102 and the control device 110 is used to control the position, velocity and acceleration of each carriage 104 on the track 102 by controlling the magnetization of the electromagnets spaced along the track 102. The control device 110 will typically be programmed to move the carriages 104 between processing stations 106 according to a predetermined sequence, with the amount of time that each carriage 104 spends at each station 106A-F being determined in advance.

Figure 2:
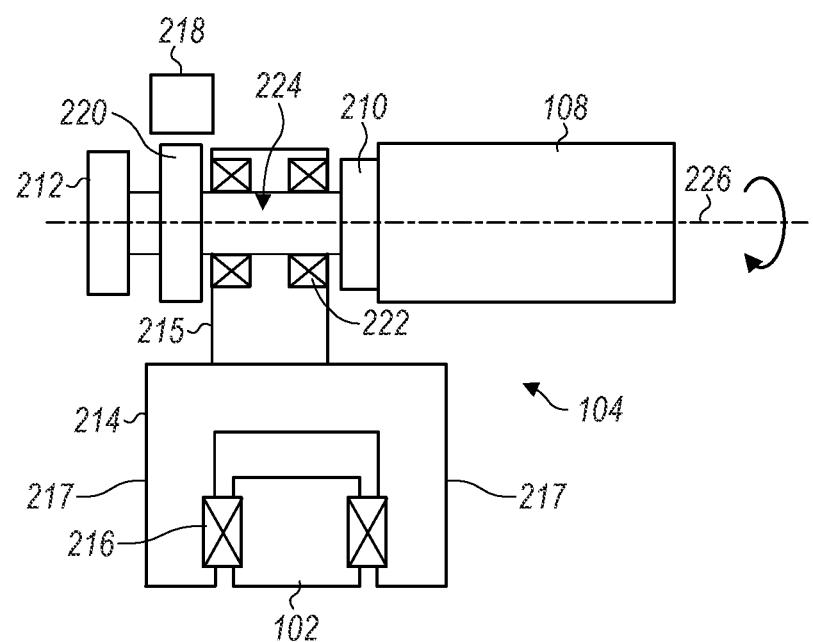
FIG. 2 is a schematic block diagram of a carrying device according to one embodiment of the invention.

FIG. 2 shows a more detailed view of an example carrying device 104 ("carriage"). The carriage 104 comprises a base 214 and an upper body 215.

The base 214 of the carriage 104 comprises two vertical side walls 217 having linear bearings 216 disposed therein. The linear bearings 216 on the base 214 are configured to engage with the track 102, allowing the carriage to move along a path defined by the track 102.

The upper body 215 comprises a path extending though its body, through which a central shaft of the handling device 224 passes. In this example, the handling device 224 is a mandrel comprising an object holder 210 adapted for holding cylindrical containers. The shaft and the object holder are connected together such that they rotate as one about the axis 226.

The shaft of the mandrel 224 is mounted to the upper portion 215 of the carriage on further bearings 222 that allow the mandrel to rotate with respect to the rest of the carriage. The mandrel 224 is oriented such that its axis of rotation 226 is perpendicular to the direction of the track 102 where it engages the base 214 of the carriage. When the carriage 104 moves along the track 102, therefore, the axis of rotation 226 of the mandrel 224 is always perpendicular to the direction of motion of the carriage 104.

The shaft of the mandrel 224 terminates at one end with a coupling disc 212 that is designed to engage a separate drive device in order to cause the mandrel 224 to rotate. The drive device may comprise a rotating drive disc or, alternatively, may drive the coupling disc using another mechanism, such as a rotating magnetic field or a friction clutch. In this example, the coupling disc 212 comprises a substantially planar surface that lies in a plane perpendicular to the axis of rotation of the mandrel 224. The geometries of the mandrel axis 226, the track 102 and the coupling disc 212 ensure that, when the substantially planar surface of the coupling disc 212 is positioned parallel to a substantially planar surface of a drive disc (to be described below), any motion of the carriage 104 along the track causes the discs to move perpendicularly with respect to their axes. This allows the coupling disc 212 to be brought into close proximity with a drive disc by moving the carriage 104 along a track 102.

The mandrel 224 is provided with an encoder ring 220 having encoded thereon information that can be used to infer the angular position of the mandrel 224 and, hence, the angular position of an object carried on the mandrel 224. A stationary read-head 218 is mounted separately at a fixed position with respect to the track 102, typically located at a processing station where the mandrel is rotated by coupling to a drive device. The read-head 218 is configured to read the angular position data encoded in the encoder ring 220, when the carriage 104 is in a position on the track 102 whereby the encoder ring 220 aligns with the read head 218, and provide information to the control device 110. This process is described in more detail with reference to FIG. 6.

On the side of the carriage 104 opposite to the coupling disc, the mandrel 224 comprises a holding device 210 for holding an object 108 to be printed on.

The holding device 210 may be a supporting insert, an internal or external retaining clip, a neck holding chuck, or another device adapted for holding an object 108 to be printed on. Preferably the holding device 210 requires no electrical, pneumatic, control or power connections to or from the carriage 104 to hold the object while the carriage 104 is in motion, as this would require inconvenient moving cabling, pipework, contacts, slip-rings, etc.

The objects 108 shown in FIG. 2 are cylindrical containers, though it shall be understood that the object could be a different object including but not limited to necked or un-necked monobloc containers, cans, bottles, tubes, pots, cups or other containers, or caps (e.g. wine bottle screw caps). The object may comprise materials such as metal, coated metal, pre-printed material, plastic, paper, card. The objects to be printed are preferably cylindrical but may have other geometries.

Figure 3:
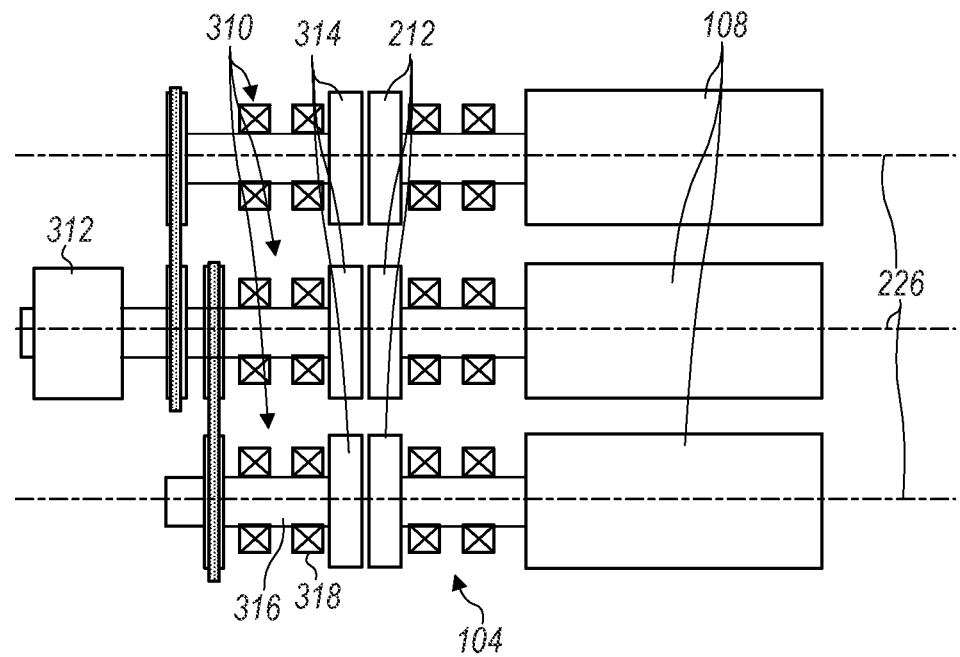
FIG. 3 is a schematic diagram of a system comprising three drive devices in engagement with three carrying devices according to a second embodiment of the invention.

FIG. 3 shows a system in which three carrying devices 104 are coupled to three drive devices 310.

In this example, the three drive devices 310 are driven from a single motor 312 using two belts. In general, a single motor 312 can drive any number of drive devices using belts, gears, or other such linking mechanisms. In some embodiments drive devices 310 may each be driven independently by their own individual motor 312.

The drive devices 310 are located at processing stations positioned adjacent to a point on the track 102. Each drive device 310 may be located at a seperate processing station 106A-106F, or the drive devices 310 may be located at a single one of processing station 106A-106F that is able to process a plurality of objects 20 simultaneously.

The coupling of the carrying devices 104 to the drive devices 310 occurs when the carrying devices 104 are moved along a track into the vicinity of the drive devices. When the carrying device 104 reaches a drive position, in which the axis of the handling device 224 is coaxial with an axis around which the drive device 310 provides a torque, the rotatable handling device 224 is engaged by the drive device and forced to rotate.

In the system of FIG. 3, each drive device 310 comprises a drive shaft 316 that is mounted on drive bearings 318 allowing the drive shaft 316 to rotate around its axis. The drive shaft 316 is coupled to a motor 312 which imparts a torque causing the drive shaft 316 to be driven rotationally.

At one end of the drive shaft is mounted a drive disc 314 designed to couple with a coupling disc 212 of a handling device. The axes of the drive devices 310 are oriented to be perpendicular to the direction of the track 102. The exact orientation of the drive devices 310 and handling devices are configured such that when a carrying device 104 moves into the vicinity of the drive device 310, the coupling disc 212 of the handling device 104 and the drive disc 314 of the drive device 310 are close together in a face to face relationship. A coupling torque between the drive disc 314 and the coupling disc 212 causes the motion of the coupling disc 212 to synchronize with the motion of the drive disc 314.

Coupling of rotational motion between the drive disc 314 and the coupling disc 212 may be provided by a number of mechanisms that provide angular velocity at the chosen processing/printing speed.

In some embodiments, the coupling mechanism is mechanical and may take the form of gears, clutches or friction wheels. Other examples of coupling mechanisms are electromagnetic couplings (discussed with reference to FIG. 4) and permanent magnet couplings (discussed in relation to FIG. 5).

Figure 4:
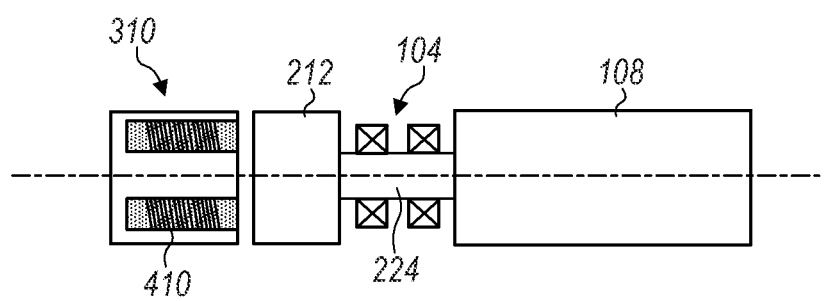
FIG. 4 is a schematic diagram of a drive device comprising an electromagnetic coupling mechanism and a carrying device according to a third embodiment of the invention.

FIG. 4 shows schematically an example of a drive device 310 and carrying device 104, in which the drive device 310 and coupling disc 212 are configured to engage with one another electromagnetically. In this embodiment, the drive device 310 does not rotate, but instead generates a rotating magnetic field. The coupling disc 212 comprises magnetic elements that, when the coupling disc 212 is aligned with the drive device 310, experience a force due to the rotating magnetic field which causes the coupling disc 212 to rotate with the magnetic field.

It is known that a rotating magnetic field can be generated by an appropriately arranged set of electromagnetic coils 410 that are energised with alternating currents with appropriate phasing. The phase differences between coils 410 produces a rotating magnetic field whose rotational speed is determined by the frequency of the alternating current and whose direction is determined by the relative phase order of the currents. Operating such a drive device entails driving the coils with electrical current in the above described way.

Figure 5:
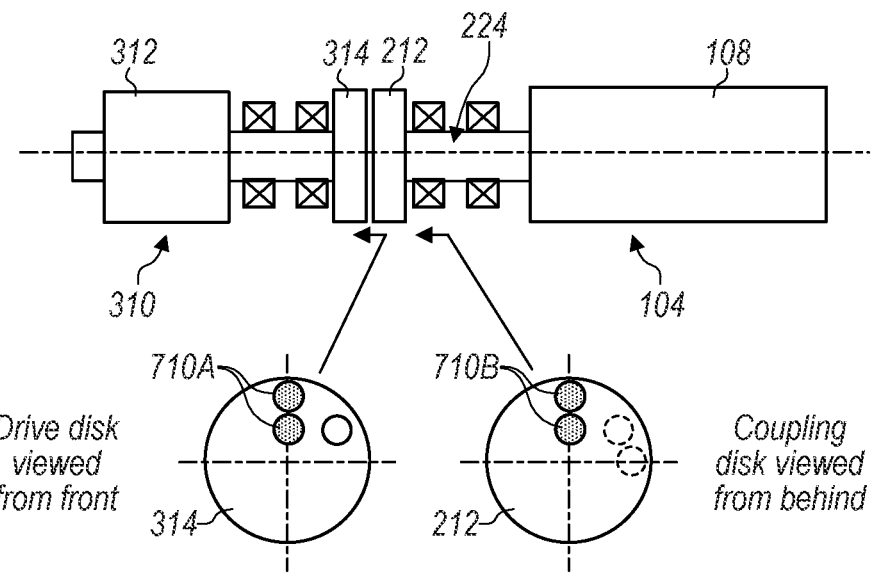
FIG. 5 is a schematic diagram of a drive device comprising permanent magnetic elements according to a fourth embodiment of the invention.

FIG. 5 shows an example of a drive device 310 and carrying device 104, in which a drive disc 314 and coupling disc 212 are configured to engage with one another through the interaction of magnetic elements disposed in the facing surfaces of the respective discs.

In the example shown in FIG. 5, the drive disc 314 and the coupling disc 212 are formed of a non-magnetic material. Each of the discs has permanent magnets 710A, 710B inset into the facing surfaces of the discs in complementary patterns. When the axes of the two discs are brought into alignment when the carriage arrives at the processing station, the permanent magnets 710A of the drive disc 314 the permanent magnets 710B of the coupling disc 212 are attracted to each other. This causes the coupling disc 212, which is disposed on the rotatable mandrel 224, to rotate into alignment with the drive disc 314, thereby synchronising the rotation of the coupling disc 212 to the rotation of the drive disc 314.

Similarly to the electromagnetic coupling embodiment shown in FIG. 4, the rotational coupling of this embodiment derives from forces produced by a magnetic field acting on permanent magnets in the coupling disc 212. However, unlike the embodiment of FIG. 4, the drive disc 314 of this embodiment itself rotates at the same angular velocity at which the coupling disc 212 is required to be rotated. The rotation of the drive disc 314 is provided by a motor 312 or other such drive mechanism. The drive mechanism may be an individual drive mounted at each processing station or a common drive linked to plural processing stations by belt, gear, or the like. Operating this drive device entails rotating the drive disc in the above described way.

The drive devices described above may operate continuously or may operate as required, e.g. when aligned with a handling device.

Prior to engagement with a drive device 310, the handling device 224 may be pre-rotated such that it is rotating in the required direction as it approaches the drive device 310. This speeds up the coupling process of the coupling disc to the drive device 310. Pre-rotation may be performed by engaging the circumferential surface of the coupling disc 212 tangentially with a fixed rail or pad as the carriage moves along the track towards the drive device 310, causing the coupling disc 212 to rotate about its axis.

Furthermore, the handling device 224 may be rotated as the carriage 104 moves along the track by the rolling contact of the coupling disc 212 with a rail 150 mounted parallel with the track. The coupling disc 212 is turned by its rolling contact with the rail 150 as the carriage moves along the track, thereby causing the handling device 224, and hence the object it carries, to rotate. Such a rail 150 may be mounted at any position on the track 102 at which it is desirable to rotate the object as the carriage moves along the track 102, for example, within the drying station 106D of the printing apparatus shown in FIG. 1.

Figure 6:
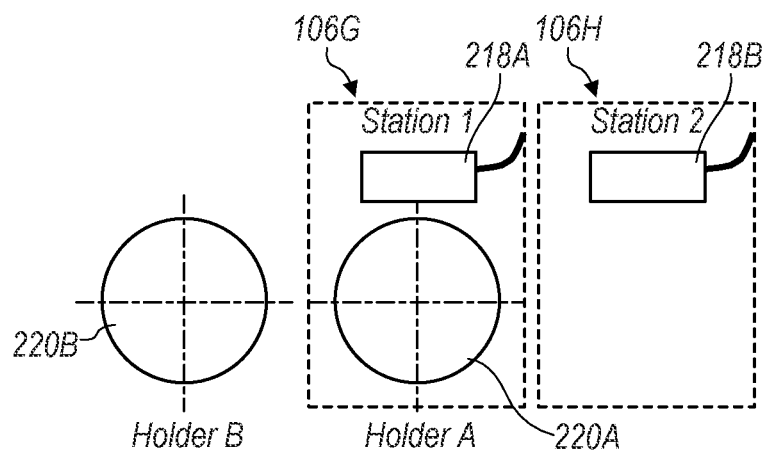
FIG. 6 is a schematic diagram of an apparatus comprising encoder rings and encoder read-heads according to a fifth embodiment of the invention.

FIG. 6 shows the use of encoder rings 220 and encoder read-heads 218 for ensuring synchronization of the rotations of the objects and the processes being performed on the objects.

This synchronisation is especially important in relation to printing processes in order to ensure reproduction of the image on the object without distortion, to ensure accurate registration of one colour separation of the image with respect to another, and to ensure correct placement of the printed image in the desired position on the object.

In order to synchronise the print process with the object rotation, real-time angular position data of the object is required by a control system operating a printhead.

In the embodiment of FIG. 6, each handling device comprises an incremental encoder strip or ring 220. The strip or ring 220 is a passive component requiring no electrical connections and can be simply mounted on the rotatable shaft of the handling device without requiring any electrical connection to the object carrying devices.

On the drive device or in the vicinity of the drive device, there is provided an optical read-head 218 that is configured to read the encoder ring 220 when the carrying device is positioned in the drive position at a processing station, and thereby determine the angular position of the object being held by the carrying device. The provision of the read-head 218 at a stationary location is advantageous because the read-head 218 requires electrical connections, the provision of which would be more complicated were the read-head moveable.

In the embodiment shown in FIG. 6, two processing stations, 106G and 106H, are provided. Each processing station comprises its own read-head, 218A and 218B. Two handling devices each comprise an encoder ring, 220A and 220B. In the position shown in FIG. 6, the encoder ring 220A of a first handling device is being read by a read-head 218A of a first processing station 106G. The process performed at the first processing station 106G can thereby be synchronized with the position of the object measured by the read-head 218A.

In a second configuration (not shown), the first handling device may be moved to a second processing station 106H, while a second handling device is moved to the first processing station 106G. In this second configuration, the first read-head 218A measures the position of the second encoder-ring 220B, and the second read-head 218B measures the position of the first encoder-ring 220A.

The use of stationary read-heads 218 that are each able to measure the rotational orientations of a plurality of moveable objects provides a simplified apparatus in comparison with known systems in which an angular position encoder is associated with a given object throughout a series of processes.

The use of stationary read-heads automatically provides the process controller at a given processing station the real-time data it needs about the position of the object currently at that station without the need to switch data permanently associated with a particular object carrier between processing stations as it progresses through the apparatus. It further eliminates the need for power or data connections to the object carrier for the purposes of reading the angular position of the object at a processing station.

The arrangement of a stationary read-head at a print station, reading from an encoder ring on the carriage, automatically compensates for errors in linear position of the carriage at a print station, if the encoder ring is the same diameter as the object being printed. This is because a small translational error or movement along the track that moves the axis of the object relative to the printhead, which would otherwise lead to a print registration error, appears to the read-head in the same way as a rotation of the encoder ring by the same tangential distance. Therefore, no print registration error results from a small translational error of the carriage position at a printing station.

An example of a suitable encoder system is a TONiC™ optical read-head combined with a RESM rotary encoder ring both manufactured by Renishaw plc. Other types of angular position encoders are possible within the scope of the invention. A further example is the VIONiC™ read-head, also from Renishaw plc.

Read-heads of this type typically have a tight tolerance on working distance between the read-head and encoder ring (2.10±0.15 mm for the VIONiC read-head), which must be maintained to provide reliable operation. In apparatuses where the mechanical variation between carriages may exceed this tolerance, it is advantageous to mount such read-heads on a mechanical "follower" mechanism to maintain a constant distance from the read-head 218 to the encoder ring 220 on each carriage 104. This may comprise, for example, a small linear slide that is moveable in a direction normal to the surface of the encoder ring 220, towards which it is lightly sprung, having a small wheel at its tip that rides on the circumferential surface of the coupling disc 212 when the carriage 104 is positioned at a processing station. The coupling disc 212 is adjacent and concentric with the encoder ring 220, and thereby provides a reference surface that the follower rides on to maintain the height of the read-head 218 relative to the encoder ring 220 to within the required tolerance.

The invention claimed is:

1. An apparatus for handling objects in a printing system, the apparatus comprising:
a carrying device that is configured to move along a path that is defined by a track;
a handling device that is adapted to hold an object and is mounted to the carrying device such that the handling device is rotatable with respect to the carrying device about a handling axis; and
a drive device disposed at a position along the path and having a drive axis; wherein
a section of the track is configured such that the carrying device is moveable along the path in a direction perpendicular to the drive axis into and out of a drive position, the handling axis being in parallel relationship with the drive axis during the movement into the drive position and during the movement out of the drive position, and wherein: in the drive position, the handling axis of the handling device is in substantial alignment with the drive axis of the drive device whereupon the drive device induces a torque in the handling device causing the handling device to rotate, thereby causing the object held by the handling device to rotate.

2. The apparatus of claim 1, wherein the handling device comprises at least one magnetic element, and wherein the drive device generates a rotating magnetic field, which acts on the at least one magnetic element of the handing device to produce the torque.

3. The apparatus of claim 2, wherein the rotating magnetic field is produced by at least one magnetic coil that is driven with an alternating electric current.

4. The apparatus of claim 1, wherein the drive device comprises a rotating drive element comprising at least one permanent magnet.

5. The apparatus of claim 1 wherein the drive device couples torque to the handling device by friction.

6. The apparatus of claim 1 wherein the rotation of the handling device is synchronised with the rotation of the drive device when the carrying device is in the drive position.

7. The apparatus of claim 1, wherein the drive device is positioned adjacent a processing station, wherein the processing station is configured to perform at least one of the following processes on the object carried by the handling device: loading, inspecting, cleaning, surface treatment, printing, drying, coating, curing, unloading.

8. The apparatus of claim 1, further comprising a rail or pad mounted adjacent to the track and wherein the handling device comprises a wheel configured to contact the rail or pad as the carrying device moves along the track, thereby causing the handling device to rotate.

9. The apparatus of claim 1, wherein the handling device is adapted to hold a cylindrical object with its longitudinal axis parallel to the handling axis, and wherein the cylindrical object is a can or tube.

10. The apparatus of claim 9, wherein the drive device is positioned adjacent to a printing device comprising a printhead, and wherein, when the handling device is holding the cylindrical object, rotation of the handling device by the drive device causes the cylindrical object to be rotated such that the printhead is able to print a swathe around an entire circumference of the cylindrical object.

11. The apparatus of claim 10,
wherein the handling device comprises an encoder-ring having encoded thereon information identifying an angular position of the handling device, and wherein the apparatus further comprises a read-head proximate to each driving device configured to measure the angular position of the handling device by reading the encoder ring; and
wherein the encoder ring has a diameter which is substantially the same as the diameter of the cylindrical object, such as to provide an equivalence, in an output from the read-head, between a linear displacement of the carrying device along the path and a circumferential displacement of the cylindrical object on the handling device, thereby to compensate for an error in the position of the carrying device with respect to the printhead.

12. The apparatus of claim 1, wherein the drive device is one of a plurality of drive devices arranged along the path, and wherein the carrying device can be successively moved to each of the drive devices.

13. The apparatus of claim 12, wherein the handling device comprises an encoder-ring having encoded thereon information identifying an angular position of the handling device, and wherein the apparatus further comprises a read-head proximate to each driving device configured to measure the angular position of the handling device by reading the encoder ring.

14. The apparatus of claim 1, wherein the carrying device is one of a plurality of carrying devices, wherein each of the plurality of carrying devices is independently moveable with respect to other ones of the plurality of carrying devices.

15. The apparatus of claim 1, wherein the track forms a closed path.

16. The apparatus for handling objects in a printing system of claim 1, wherein the handling device is a mandrel, and wherein the mandrel is oriented such that the handling axis is perpendicular to a direction of the track where the track engages a base of the carrying device.

17. A method of printing on objects using an apparatus that comprises:
a carrying device that is configured to move along a path that is defined by a track; a handling device that is adapted to hold an object and is mounted to the carrying device such that the handling device is rotatable with respect to the carrying device about a handling axis; and a drive device disposed at a position along the path and having a drive axis; wherein a section of the track is configured such that the carrying device is moveable along the path in a direction perpendicular to the drive axis into and out of a drive position, the handling axis being in parallel relationship with the drive axis during the movement into the drive position and during the movement out of the drive position, and wherein: in the drive position, the handling axis of the handling device is in substantial alignment with the drive axis of the drive device whereupon the drive device induces a torque in the handling device causing the handling device to rotate, thereby causing the object held by the handling device to rotate;
the method comprising:
moving the object held by the handling device into a vicinity of a printhead by moving the carrying device into the drive position;
rotating the handling device by operating the drive device when coupled to the handling device in the drive position; and
printing onto the object held by the handling device while the handling device is rotated.

18. The method of claim 17, wherein moving the carrying device into the drive position comprises moving the carrying device along the path in a direction perpendicular to the drive axis.

19. The method of claim 17 wherein, while the object is being printed on, a further carrying device is moved along the path that is defined by the track.

20. A printing system comprising:
a carrying device that is configured to move along a path that is defined by a track;
a handling device that is adapted to hold an object and is mounted to the carrying device such that the handling device is rotatable with respect to the carrying device about a handling axis;
a drive device disposed at a position along the path and having a drive axis; and
one or more printing devices configured to print onto the object held by the handling device while the handling device is rotated;
wherein a section of the track is configured such that the the carrying device is moveable along the path in a direction perpendicular to the drive axis into and out of a drive position, the handling axis being in parallel relationship with the drive axis during the movement into the drive position and during the movement out of the drive position, and wherein: in the drive position, the handling axis of the handling device is in substantial alignment with the drive axis of the drive device whereupon the drive device induces a torque in the handling device causing the handling device to rotate, thereby causing the object held by the handling device to rotate.

* * * * *